(12) United States Patent
Kim et al.

(10) Patent No.: US 6,359,885 B1
(45) Date of Patent: Mar. 19, 2002

(54) MULTI-CHANNEL PACKET SWITCHING APPARATUS HAVING TRAFFIC FLOW CONTROLLING AND CHECKING FUNCTIONS

(75) Inventors: Keun Bae Kim, Daejeon (KR); Paul S. Min, St. Louis, MO (US); Kyeong-Soo Kim, Daejeon (KR); Otto Schmid, St. Louis, MO (US)

(73) Assignees: Electronics and Telecommunications Research Institute, Daejeon (KR); Washington University, St. Louis, MO (US)

( * ) Notice: Subject to any disclaimer, the term of this patent is extended or adjusted under 35 U.S.C. 154(b) by 0 days.

(21) Appl. No.: 09/138,310

(22) Filed: Aug. 21, 1998

(30) Foreign Application Priority Data

Aug. 27, 1997 (KR) .............................................. 97-41734

(51) Int. Cl.[7] .............................................. H04L 12/56

(52) U.S. Cl. ...................................... 370/390; 370/395

(58) Field of Search ................................ 370/390, 392, 370/394, 395, 398

(56) References Cited

U.S. PATENT DOCUMENTS

| | | | | |
|---|---|---|---|---|
| 4,813,083 A | | 3/1989 | Lee .............................. | 370/60 |
| 4,891,803 A | * | 1/1990 | Huang et al. .................. | 370/60 |
| 4,893,304 A | * | 1/1990 | Giacopelli et al. ............ | 370/60 |
| 5,124,978 A | | 6/1992 | Chao .......................... | 370/60 |
| 5,179,552 A | | 1/1993 | Chao .......................... | 370/60 |
| 5,440,549 A | | 8/1995 | Min et al. ...................... | 370/60 |
| 5,475,682 A | | 12/1995 | Choudhury et al. .......... | 370/60 |
| 5,493,566 A | | 2/1996 | Ljungberg et al. ............ | 370/60 |
| 5,526,352 A | | 6/1996 | Min et al. ..................... | 370/60 |

OTHER PUBLICATIONS

Tony T. Lee, "Nonblocking Copy Networks for Multicast Packet Switching", 1988, pp. 327–338.
Hyong S. Kim, "Multichannel ATM Switch with Preserved Packet Sequence", 1992, pp. 1634–1638.
Peter S. Lau, et al., "Design and Analysis of a Multilink Access Subsystem Based on the Batcher–Banyan Network Architecture", 1992, pp. 1757–1766.
Soung C. Liew, "Multicast Routing in 3–Stage Clos ATM Switching Networks", 1994, pp. 1380–1390.

* cited by examiner

Primary Examiner—Melvin Marcelo
(74) Attorney, Agent, or Firm—Cohen, Pontani, Lieberman & Pavane

(57) ABSTRACT

A multi-channel packet switching apparatus having traffic flow controlling and checking functions which is capable of simply controlling the system and having a simpler construction by concurrently performing a cell copy function and a cell routing function for providing a multi-casting function. The apparatus includes a synchronizing unit for synchronizing the cells recirculated through the recirculation link with the cells newly inputted into the routing unit based on time and providing to the routing unit, a reverse direction flow control requesting unit for counting the number of cells which are recirculated at every cell time and requesting a reverse direction flow control to a traffic providing source when the thusly counted number exceeds a threshold value, a reverse direction buffering control unit for restricting a cell output to the output port through which a request signal is outputted when a reverse direction flow control request signal is received from the traffic receiving source until the request signal is released, an error cell removing unit for removing an error cell based on the routing tag error among the cells from the bypass link by the routing unit within a predetermined time, and a cell loss counting unit for counting the cell loss which are not recirculated by the recirculation path setting unit by the input port.

21 Claims, 9 Drawing Sheets

MULTI-CHANNEL PACKET SWITCHING APPARATUS HAVING TRAFFIC FLOW CONTROLLING AND CHECKING FUNCTIONS

BACKGROUND OF THE INVENTION

1. Field of the Invention

The present invention relates to a fixed length packet switching apparatus (asynchronous transfer mode switching apparatus) which is used for building a B-ISDN (Broadband-Integrated Service Digital Network), and particularly, to an improved multi-channel packet switching apparatus which is composed of a multi-channel switch structure having a physically/logically configured multipoint-to-multipoint connection between input and output ports and is capable of preventing a cell loss and checking a lost cell.

2. Description of the Conventional Art

The technique concerning the ATM (Asynchronous Transfer Mode) which is capable of performing a transmission and exchange operation by the fixed length packet unit is important for building the B-ISDN (Broadband-Integrated Serivce Digital Network). In particular, the switching system which is one of the major systems in the communication network is implemented based on the ATM switching technique. In order to implement the above-described purposes, much study has been performed concerning the ATM switch structure. Switches which have been developed as a result of the above-described studies are currently used in the industry.

There are various ranges of speed of a link for the B-ISDN. In the B-ISDN, the information should be transmitted/received at a high speed. The basic speed of information was 155 Mbps which is the equivalent of an STM-1 (Synchronous Transfer Mode-1) and 622 Mbps which is the equivalent of an STM-4. However, 2.5 Gbps, 10 Gbps, even 100 Gbps are recently required for the high speed Gigabit Transport Network. The ATM system having a low speed of 25 Mbps, 51 Mbps, etc. may be used for Subscriber Access Network for the reason that the service network should be established at low cost. Therefore, a new switching system should have the capability of effectively adapting the above-described various channel speeds, that is multichannel switching capability.

However, the conventional switching system adapts a single channel switching method which is directed to a single-to-single interrelationship between the input and output ports for the switch network. In more detail, the single channel switching method is directed to a method wherein the output port physically and logically has one link. Therefore, the operations for allocating the bandwidth in a switch network and setting a routing path are independently implemented with respect to each port.

The multi-channel switching method is configured based on a multi-to-multi connection method between the input and output ports, and a plurality of input and output links are grouped to one link, so that the link group is logically operated as one port. Namely, since the inputted cells are provided with a routing path through one port in the group which has the same logic cells, the path setting is performed based on much opportunity, and since the total band width of a plurality of links in one logic port are shared at the maximum, it is possible to effectively use the assigned boardwidth, so that the burst characteristic of the ATM traffic is implemented.

Therefore, the system can concurrently use the input and output links, which require different speeds, through one switch network by using the above-described multi-channel switching technique. In this case, a time sharing multiplexing and demultiplexing unit which has a simple function is added to the system, whereby it is possible to configure a system which is capable of adapting various speed ranges. Therefore, it is possible to reduce the cost which is required for the system which is capable of adapting various transmission speeds.

A switching technique is disclosed for providing a few multi-channel switching functions based on the above-described demands.

Achille Pattavina disclosed a method for implementing multi-channel switching using a Batcher Banyan network in the article "Multi-channel Bandwidth Allocation in a Broadband Packet Switch: IEEE JSAC, Vol. 9, Dec. 1988, pp 1489–1499". The switching apparatus which was disclosed in the above-described article is directed to using an input buffer method which checks whether a path allocation is performed and then routes a cell. Therefore, the cell loss does not occur in the switch network; however, a head-off line blocking phenomenon occurs, as a result of the input buffer method. Therefore, the cell processing capability is decreased. In addition, since there is not provided a function for preserving the sequence of cells in the switching system itself, the cell sequence should be adjusted at an end point.

Hyong S. Kim disclosed a method werein a switching apparatus is operated by a virtual FIFO (First In first Out) method in order to support a cell sequence preserving function in the article "Multi-channel ATM switch with Preserved Packet Sequence: ICC 92, 1992, pp 1634–1636". This method requires an internal buffer in the switch network. In this method, it is possible to preserve the sequence of the cells; however, the buffer should be configured to have a sharing buffer type in order to reduce the capacity of the buffer, and two memory pointers are required for providing the characteristic of the FIFO, whereby the method for controlling the memory becomes complicated. In addition, since the cell storing and cell output for the memory are concurrently processed with respect to an N-number of switch input and output ports, the memory should be virtually divided into an N-number of memory spaces. Therefore, the memory control may be complicated, and the size of the switch is increased. In addition, when the port requires a high speed operation, the system becomes complicated under the condition such as memory access time.

The function for preserving the sequence of the cells from the switching system is the most important function. In particular, in the multi-channel switching method, the above-described function is considered as the more important function. Namely, when outputting the cells from one input link and the cells are divided into several input links and inputted through one virtual path to the grouped port composed of a plurality of output links, the output sequences of the cells are maintained.

However, in most conventional multi-channel switching methods, the function for preserving the output sequence of the cells is not included in the switching network. Namely, the cell to which sequence information is added is transferred to a service end point, and then the sequence of the cells are adjusted using a buffer mechanism at the service end point.

Therefore, both the end points of the service should be provided with a predetermined protocol for preserving a desired cell sequence, and such protocol should be identical at both the end points. In addition, since the sequence information is added to a payload of the cell, the transmission efficiency of the cell is decreased.

In addition, a copy function of a cell should be included in the switching network for providing a multi-casting service. Many switches among the conventional space division switches process a cell copy and a routing operation to an output port of the copied cells using an additionally provided network. Namely, a method, in which a desired number of ports is copied, and a path is designated through a routing network with respect to each of the copied cells, is used.

In order to implement the above-described method, the cell is copied to a plurality of output ports, respectively, in accordance with information with respect to a predetermined amount (the number of fanouts) for the copy, and the routing network allocates to a corresponding path in accordance with information of the final output port of a corresponding cell with respect to each cell which is divided to multiple ports and outputted.

Here, the conventional switch has a problem in that two network, namely, the copy networks and the routing network, are required for the multi-casting service, and a large capacity look-up table is required between the two networks.

In other words, the copy network performs the copy operation of the cells using digit information which should be copied, and outputs the thusly copied cells to the output port of the copy network. In this case, a fixed output port is not allocated to the cells included in one virtual path. Namely, a predetermined output port is allocated at every cell time. Therefore, a table is required for determining an output port of a routing network of a corresponding cell using predetermined information (for example, a connection identifying number which is a connection number allocated as a predetermined value in the system) included in the cell from the output port of the copy network. Namely, since it is impossible to check which copied cell is outputted to which output port, the routing table is required. In each table, the same routing path information exists in duplicate.

The entire switching system is made complicated in accordance with its operation and construction. In particular, if there are a number of virtual paths for supporting each input link, the capacity of the table should be increased. As the speed of the system input and output links is increased up to 622 Mbps and 2.5 Gbps, the number of the virtual paths for supporting the high speed operation is sharply increased. Therefore, the cost for building the system is increased, and it is difficult to configure the system which is capable of accessing the table at a high speed.

In addition, in the switching system, the cells may be lost due to an over input traffic environment. The cells which are successfully outputted from the switching apparatus in accordance with the load state of the destination device to which the output port is connected may be lost at the destination. Namely, it is possible to minimize the loss of the cells by performing flow control of proper traffic between the destinations in which the input traffic source and output traffic are received.

However, since most conventional switching apparatuses have functions for routing the cells, the function for controlling the flow of the traffic is not provided therein.

In addition, even though there is provided such traffic flow control function, cell loss may occur in the apparatus in accordance with the load of the traffic. Therefore, in view of the management of the system, it is necessary to recognize that when cell loss occurs in a predetermined input port, when the cell loss occurs it is possible to prepare a proper measurement with respect to the lost cell. However, since most commercial switching system do not have such function in the switch chip, a device should be additionally provided to the system input/output matching unit for the above-described reasons.

In the cells inputted into the switching apparatus, a destination address information is included in the routing tag, and the switching apparatus performs a self-routing operation in accordance with the information. Here, if the destination address of the routing tag is not matched with the destination address of the output ports of an actual switching apparatus for a predetermined reason, the cells inputted continuously stay in the switching apparatus, thus increasing a consumption of the resources of the apparatus. Therefore, the switching apparatus should be equipped with a function for automatically removing the error cells.

SUMMARY OF THE INVENTION

Accordingly, it is an object of the present invention to provide a multi-channel packet switching apparatus having traffic flow controlling and checking functions which overcomes the aforementioned problems encountered in the conventional art.

It is another object of the present invention to provide a multi-channel packet switching apparatus having traffic flow controlling and checking functions which is capable of allowing the input and output ports of a switch to have a multi-to-multi function, namely, a multi-channel function, thus effectively adapting an input and output link which exceed a basic speed V of the switch and is capable of increasing a service providing capability of a switching apparatus using a multi-rate function based on one switching network with respect to the links having different speeds by dynamically configuring the links by the group unit.

It is still another object of the present invention to provide a multi-channel packet switching apparatus having traffic flow controlling and checking functions which is capable of simply controlling the system and having a simpler construction by concurrently performing a cell copy function and a cell routing function for providing a multi-casting function.

It is still another object of the present invention to provide a multi-channel packet switching apparatus having traffic flow controlling and checking functions which is capable of effectively concentrating the missed cells in the case that the cells having the identical address are missed during an allocation process with respect to an output port group and minimizing the cell loss by recirculating to the routing network.

It is still another object of the present invention to provide a multi-channel packet switching apparatus having traffic flow controlling and checking functions which is capable of maintaining a multi-channel switching operation and an output sequence of the cell output during the cell recirculation.

It is still another object of the present invention to provide a multi-channel packet switching apparatus having traffic flow controlling and checking functions which is capable of maximizing the cell processing capacity of a switch by configuring a unit switch of multiple networks based on the unit switch using a multi-channel switch, simplifying a path allocation operation based on a bandwidth checking in the switching apparatus, and recognizing the bandwidth of the links connected with a predetermined terminal as one integrated bandwidth.

It is still another object of the present invention to provide a multi-channel packet switching apparatus having traffic flow controlling and checking functions which is capable of simplifying a routing of an inner pattern when integrating the switching apparatus using a 2×2 switch device for a routing network and a concentrating network for providing a recirculation path and a pattern connection characteristic composed of a column and a row which are the characteristic of a crossbar network.

It is still another object of the present invention to provide a multi-channel packet switching apparatus having traffic flow controlling and checking functions which is capable of minimizing a cell loss for the entire system by detecting a cell loss in the switching apparatus and performing a flow control operation, thus increasing a cell processing efficiency.

It is still another object of the present invention to provide a multi-channel packet switching apparatus having traffic flow controlling and checking functions which is capable of automatically removing an error cell within a predetermined time, which error cell continuously occupies the source of the apparatus in a state that the error cell is not routed to an output port in accordance with an error of a routing tag.

It is still another object of the present invention to provide a multi-channel packet switching apparatus having traffic flow controlling and checking functions which is capable of supplying a traffic management of the entire system by counting the number of lost cells by the port to which the lost cells are inputted which occur due to the lack of the source of the switching apparatus under an over traffic environment and reporting a result of the supply to a system control function unit.

To achieve the above objects, there is provided an improved multi-channel packet switching apparatus having traffic flow controlling and checking functions which includes an output group address generation unit for generating an address information of a grouped output port, a routing unit for receiving a cell recirculated through a recirculation path and a newly inputted cell, allocating an output link with respect to the recirculated cell when an address by the output port inputted from the output group address generation unit and a destination address set in a routing tag of the cell inputted by the port are identical, and outputting cells, which are not applied to the output link, through a plurality of bypass links, a recirculation path setting unit for selecting cells as many as the number of recirculation paths among the cells inputted through a plurality of bypass links and outputting through the recirculation outward link, a synchronizing unit for synchronizing the cells recirculated through the recirculation link with the cells newly inputted into the routing unit based on time and providing to the routing unit, a reverse direction flow control requesting unit for counting the number of cells which are recirculated at every cell time and requesting a reverse direction flow control to a traffic providing source when the thusly counted number exceeds a threshold value, a reverse direction buffering control unit for restricting a cell output to the output port through which a request signal is outputted when a reverse direction flow control request signal is received from the traffic receiving source until the request signal is released, an error cell removing unit for removing an error cell based on the routing tag error among the cells from the bypass link by the routing unit within a predetermined time, and a cell loss counting unit for counting the cell loss which are not recirculated by the recirculation path setting unit by the input port.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limiting of the present invention, and wherein.

DETAILED DESCRIPTION OF THE INVENTION

The multi-channel packet switching apparatus having traffic flow controlling and checking functions according to the present invention will now be explained with reference to the accompanying drawings.

Figure 1:
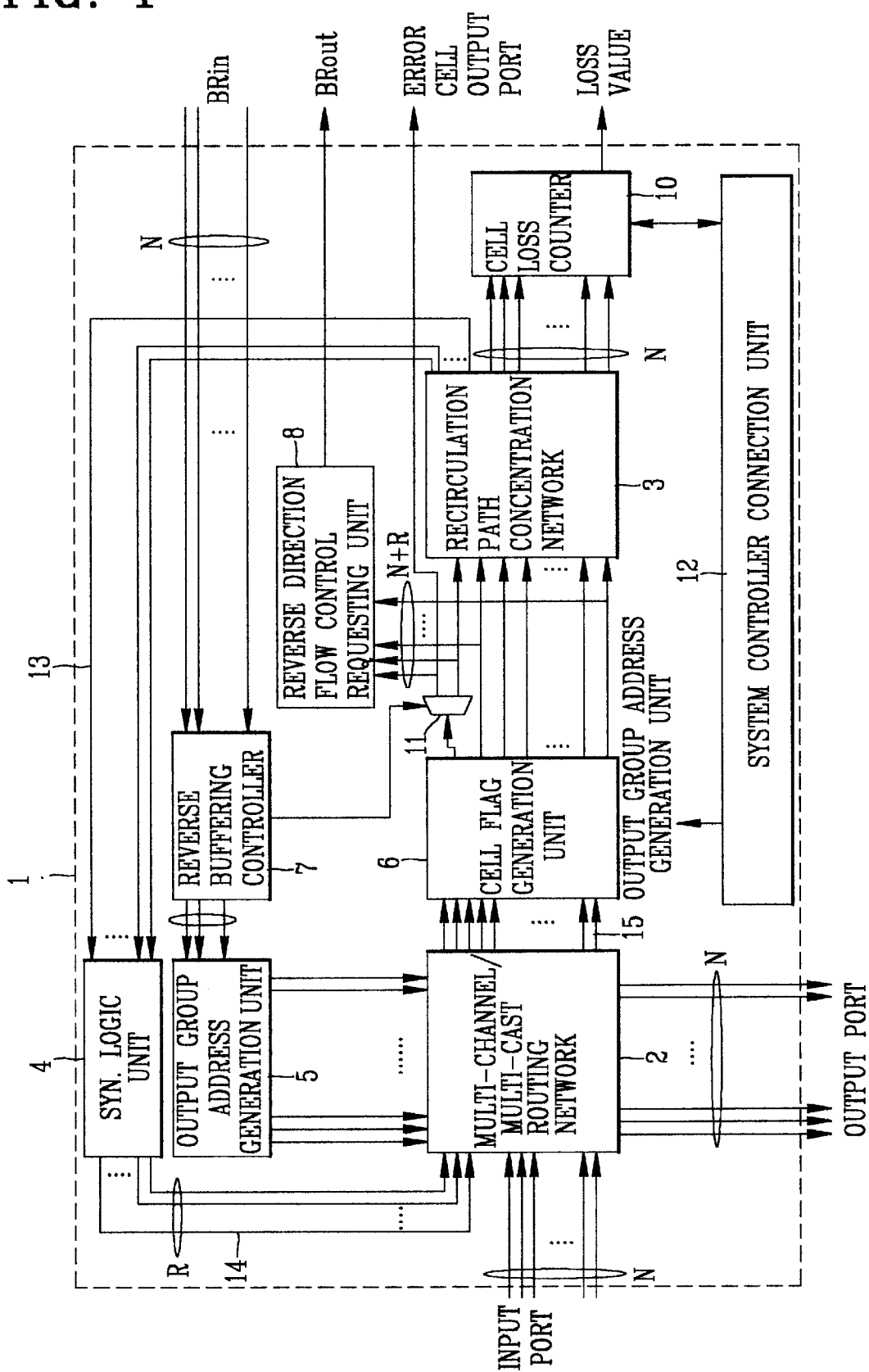
FIG. 1 is a block diagram illustrating a multi-channel switching apparatus according to the present invention.

In FIG. 1, reference numeral 2 denotes a routing network, 3 denotes a recirculation path concentrating network, 4 denotes a synchronous logic unit, 5 denotes an output group address generation unit, 6 denotes a cell flag generation unit, 7 denotes a reverse direction buffering controller, 8 denotes a reverse direction flow control requesting unit, 10 denotes a cell loss counter, 11 denotes an error cell selection unit, and 12 denotes a system controller connection unit.

In the apparatus according to the present invention which is directed to providing multi-channel and multi-casting functions and a high performance and assigned maintaining function, there are provided a routing network (MMRN: Multi-channel/Multi-cast Routing Network) 2 for providing a multi-channel and multi-cast switching function, a recirculation path concentrating network (RPCN) 3 for selecting cells as many as the number of recirculation paths among the cells missed during a routing process with respect to an output port of the cells having the identical destination addresses and recirculating the thusly selected cells to the routing network 2, a cell flag generation unit (ACFG: Assigned Cell Flag Generator) 6 for receiving the cells missed by the routing network 2, adding the flags which denote the assigned characteristics of the cells and providing to the recirculation path concentrating network 3, a synchronous logic unit 4 for time-synchronizing the cells which are recirculated through the recirculation path concentrating network 3 and the cells which are newly inputted to the routing network, an output group address broadcaster 5 for providing an address information of the grouped output port, a reverse direction flow control requesting unit (BSGU: Backpressure Signal Generator Unit) 8 for comparing the value obtained by counting the number of the cells inputted from the routing network 2 to the recirculation path concentrating network 3 with a previously set limit value, and generating or releasing a request signal for a reverse direction flow control in accordance with a result of the comparison, a reverse direction buffering controller (BBCU: Backpressure Buffering Control Unit) 7 for interpreting a reverse direction flow control request signal which is provided by the output port and providing a control signal to the output group address generation unit 5 for restricting a cell output to a corresponding output port, a cell loss counter (CLC: Cell Loss Counter) for counting a cell loss value, which occurs in accordance with the lack of the recirculation path, by each input port, an error cell selection unit 11 for receiving a control of the reverse direction buffering controller 7 and removing an error cell, which occurs due to the error of a routing tag, to an externally connected apparatus, and a system controller connection unit (CIU: Controller Interface Unit) 12 for dynamically converting an address information from the output group address generation unit 5 and a limit value from the reverse direction flow control requesting unit 8, receiving a loss value information from the cell loss counter 10 and transferring to the system controller.

The operation of the thusly constituted apparatus according to the present invention will now be explained with reference to the accompanying drawings.

The output group address generation unit 5 stores an output port grouping address information from the system controller at the time when the system is initialized or is operated and provides the thusly stored information to the multi-channel/multi-cast routing network 2. Here, the address information inputted from the output group address generation unit 5 is compared with the destination address included in the cell for the routing operation in order to determined a destination output port of the cells inputted into the multi-channel/multi-cast routing network 2. In addition, if the number of the output ports of the switching apparatus is N (natural numeral), there are an N-number of address information stored in the output group address generation unit 5.

The multi-channel/multi-cast routing network 2 receives the cells through an N-number of input links of the switching apparatus, and receives recirculation cells through the R-number of recirculation input links, and compares the destination address of the thusly inputted cells with the output port grouping address from the output group address generation unit 5. In addition, the cells which are to be routed to the output port in accordance with a result of the comparison are outputted to the output port through the output link, and the cells among the cells having the identical destination address, which cells are not routed to the output port, are outputted to the cell flag generation unit 6 through an (N+R) number of bypass links 15.

The cell flag generation unit 6 checks whether there is a destination output port address in a routing tag of a cell transferred from the routing network 2 through the bypass link 15. If the path to the output port corresponds to the allocated cell in the routing network 2, a null value address information is stored in the routing tag. If the cell should be outputted at the next cell transmission time, the destination address information is directly stored in the routing tag. Therefore, the cell flag generation unit 6 checks whether the address information in the routing tag corresponds to the null value. If the information is the null value, the flag value is stored as 0, and if there is a destination address information, the flag value is stored as 1.

The recirculation path concentration network 3 selects an R-number of cells which is the limited link number among the cells having a flag value of 1 among the cells inputted from the cell flag generation unit 6 and outputs the R-number of recirculation output links 13 to the synchronous logic unit 4 through the recirculation output link 13.

In order to synchronize the cells inputted through the R-number of the recirculation output links, 13 and the cells which are newly inputted through the N-number of input links, the time difference between the cells inputted through the recirculation output links 13 are adjusted, and the thusly adjusted time difference is supplied to the routing network 2.

The time difference-adjusted recirculation cells are inputted into the routing network 2 through the R-number of the recirculation input links 14 and are processed together with the newly inputted cells which are inputted into the routing network 2 through the R-number of the recirculation input links 14, so that the routing operation with respect to the output ports are performed.

In the present invention, there are externally provided switches having an N-number of input ports and the N-number of output ports. However, the switches internally have a shared memory characteristic corresponding to the R-number of cells. Therefore, the total input link number of the multi-channel/multi-cast is (N+R=M).

The maximum N-number of the cells among the M-number of cells is provided to the switching path to the output port, and the cells which are not allocated for the paths are inputted into the recirculation path concentration network 3 through the bypass links. In addition, the R-number of the cells are selected, and are inputted into the multi-channel/multi-cast routing network 2 through a synchronizing process. In addition, the routing operation is performed with respect to the thusly recirculated cells and newly inputted cells for receiving allocation paths to the output ports.

The reverse direction flow control requesting unit 8 counts the number of the cells which are not allocated for the output ports by the routing network 2 at every cell transmission time, and when if the number of the thusly counted values exceeds a predetermined value, the enabled reverse direction flow control requesting signals are transmitted to the upward traffic supplying source. After the enabled reverse direction flow control requesting signals are transmitted, the number of the cells which are not allocated for the output ports is counted at every cell transmission time. If the thusly counted value is below a predetermined low limit value, the enabled flow control requesting signal is disabled, and is transmitted to the upward direction traffic supplying source.

In the present invention, the reverse direction flow control requesting unit 8 receives the cells applied to the recirculation path concentration network 3 from the cell flag generation unit 6 for counting the number of cells which are not allocated for the output ports.

The reverse direction buffering controller 7 receives a reverse direction flow control requesting signal which corresponds to a corresponding output port which signal is transferred from the downward direction traffic receiving source and checks whether there is an enabled flow control requesting signal among the N-number of the flow control requesting signals at every cell transmission time. As a result of the check, if a requesting signal which corresponds to the output port is enabled, the address information from a corresponding output port from the output group address generating unit 5 is controlled to have a null value. Therefore, the cell output to a corresponding output port is restricted. In addition, when the enabled flow control requesting signal is disabled, the address information of a corresponding output port from the output group address generation unit 5 is controlled to have an original value so that the cell is transmitted to a corresponding output port.

The cell loss counter 10 accumulatively stores the amount of cell loss at every cell time with respect to the cells which should be loss-processed due to their losing from the recirculation path which is restricted by the recirculation path concentration network (RPCN).

If the inputted cell has a destination address which is not related with the addresses of the output ports existing in the apparatus due to the error, since the same are not identical during an address comparison process in the multi-channel/multi-cast routing network (MMRN), a problem that the recirculation path concentration network 3 permanently occupies the recirculation path may occur. Therefore, the cells should be automatically removed after a predetermined time. The input terminal of the error cell removing selection unit 11 is connected with a first row of the cell flag generation unit 6 which corresponds with a first row of the multi-channel/multi-cast routing network 2, and the input/output terminal is externally connected for removing the error cell, and the other output terminal is connected with a first input terminal of the recirculation path concentration network 3. The thusly connected error cell removing selection unit 11 does not output the first row input signal from the cell flag generation unit 6 through the bypass path of the recirculation path concentration network at usual time in accordance with the control signal, namely, the signal is externally outputted. Therefore, the error cells are automatically removed through the error cell output port within a predetermined time. In addition, when the error cell removing selection unit 11 receives a control signal from the reverse direction buffering controller 7 which signal means that the reverse direction buffering operation is performed, the signal is outputted to the first row input terminal of the recirculation path concentration network 3 so that the first row output signal from the cell flag generation unit 6 is recirculated. As a result, it is possible to prevent the assigned cells from being removed to the outside of the apparatus due to the reverse direction buffering, not the error cell.

The system controller connection unit (CIU: Controller Interface Unit) 12 provides some functions for connecting with a controller of the system, setting first and second limit values of the reverse direction flow control requesting unit 8, receiving the cell loss information from the cell loss counter 10, transferring to the system controller, and dynamically converting the address information by the output port stored in the output group address generation unit 5.

Figure 2:
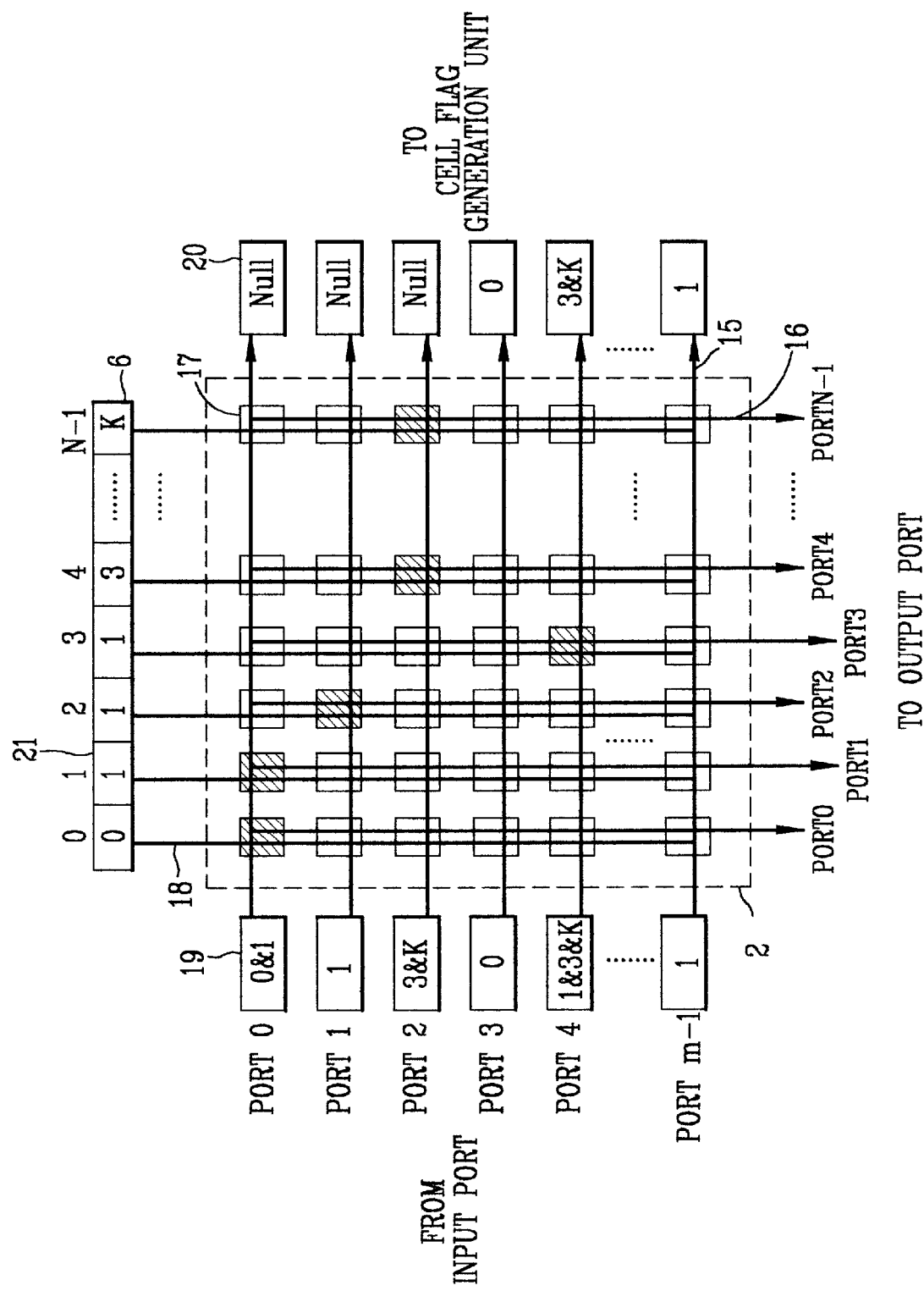
FIG. 2 is a view illustrating a routing network according to the present invention.

FIG. 2 is a view illustrating an operation of the multi-channel/multi-cast routing network 2.

The multi-channel/multi-cast routing network 2 includes an M-number of input links, an N-number of output port output links, and an M-number of bypass links 15.

The multi-channel/multi-cast routing network 2 is configured based on the crossbar network composed of a 2×2 switch device 17. Namely, the multi-channel/multi-cast routing network 2 is composed of an M×N number of switch devices.

The operation of the multi-channel/multi-cast switching operation of the multi-channel/multi-cast routing network according to the present invention will now be explained.

First, the output group address generation unit 5 which provides an output port address information includes an N-number of the grouping address information 12 and provided a channel group information selected in accordance with a system requesting signal.

FIG. 2 illustrates an example that an output port 1 is composed of three physical links. Namely, The cells having an output address of 1 among the input cells are provided with maximum three paths at the same time. Here, the condition of the G-number of the grouping links with respect to one output address is $1 \leq Gi \leq N$ wherein $Gi(1 \leq i \leq N)$, and the sum of the same can not exceed N. Namely, one logic output link is composed of one physical link through an N-number of the physical links.

The output port channel grouping address information is composed by the column and is transferred to all switch devices in the same column through the address transfer path 18.

As shown in FIG. 2, the first column of the multi-channel/multi-cast routing network 2 receives an information with respect to the output port address of 0, and the column from the second column to the fourth column receives information with respect to the output port address of 1, respectively, and the fifth column receives an information with respect to the output port address of 3.

The input cells 19 which are inputted through the M-number of input links are inputted in a type in which the routing tag region is added to the front terminal of the ATM cell of 53 bytes, and such routing tag includes a plurality of output port address information for the multi-casting operation. In order to express a plurality of output ports using the routing tag having a limited number of bits, a bit addressing method which is directed to allocating the bits by the output port is used.

For example, when the size of the switch is 8×8, the routing tag of the cell which requires output ports of 0, 1, 4 is expressed as "10011". The leftmost bit corresponds to a bit with respect to the port 7, and the bits with respect to the port 0 is expressed in accordance with the sequence from the right side.

The information in the routing tags are used for comparing the output port grouping address information from the output group address generation unit 6 in each switch device and the address information itself. If the address information is matched, and the connection setting to the output port is not implemented by the switch device of the upper circuit of the identical column, the input cell are connected with the output ports by the current switch device. Namely, only one switch device in the identical column is connected with the output port. In addition, in the connected cell, since the address information with respect to a corresponding output port is removed in the routing tag, the same is duplicated to the other output port which is grouped to one group, so that the routing operation is not performed.

The cell 20 which is finally outputted to the end of the row through the routing tag conversion process in the identical row is converted into the routing tag having only a destination address information which should be outputted at the next cell transmission time. The address information conversion step of the routing tag will now be explained with reference to FIG. 3.

Figure 3:
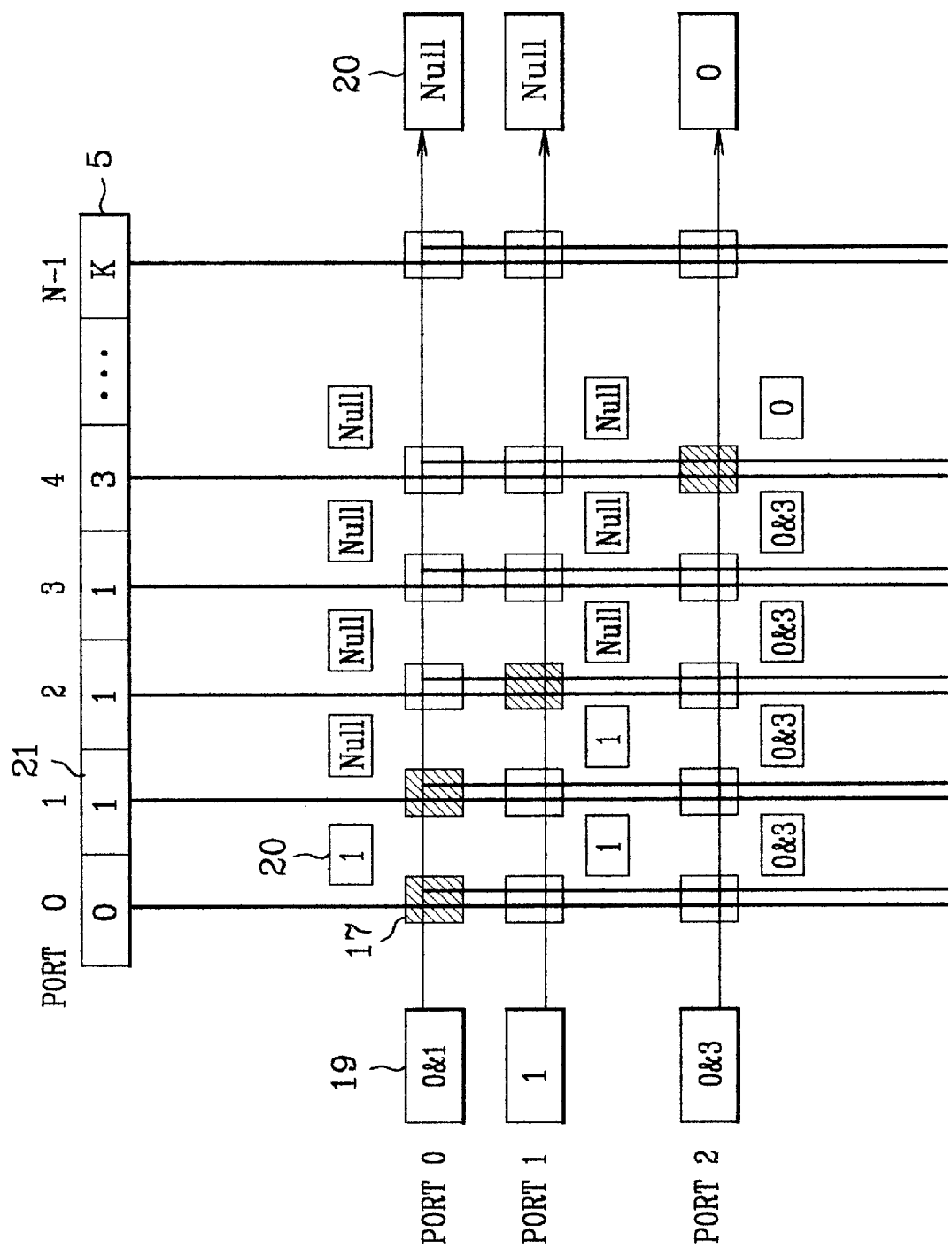
FIG. 3 is a view illustrating a routing tag inversion according to the present invention.

As shown in FIG. 3, the cells inputted through the input port 0 have destination output port addresses of 0 and 1, thus requesting a multi-casting operation. In addition, the cells inputted through the input port 1 are the cells requiring a routing through only the output port 1, and the cells inputted through the input port 2 have output port addresses of 0 and 3.

The switch devices of the first row and first column provide the input port 0 as a path to the output port 0 with respect to the cells inputted through the input port 0. At the same time, the address information with respect to the output port 0 is removed in the routing tag, and only the address information with respect to the output port 1 is transferred to the next switch device of the identical row.

The switch devices of the first row and second column set the path with respect to the output port 1 and remove the address information with respect to the output port 1 in the routing tag, so that the routing tag of the input cell is converted into a state that there is no more desired output port, namely, the same is converted into an unassigned cell having a null information.

The switch devices of the second row and first column do not perform a connection setting operation since the grouping address information 21 from the output group address generation unit 5 and the address information of the routing tag are different. Therefore, the input cell is transferred to the second column switch device in the identical row without a conversion of the routing tag.

The switch device of the second row and third column are not performed for a path section by the upper switch, and since the address information is identical, the path is set and at the same time the routing tag having a null value which indicates that there is not an address information to be outputted is transmitted to the next switch device. In the remaining switch devices of the identical row, the routing tags do not have an assigned output address, the connection setting operation is not performed.

The cells inputted into the input port 2 receive the path corresponding to the output port 3 since the path with respect to the output port 0 is set in the upper terminal of the first column, and there is not a channel grouped to the output port 0, and the routing tag is outputted to the final terminal of the row in a state that there remains an address information with respect to the output port 0.

Figure 4:
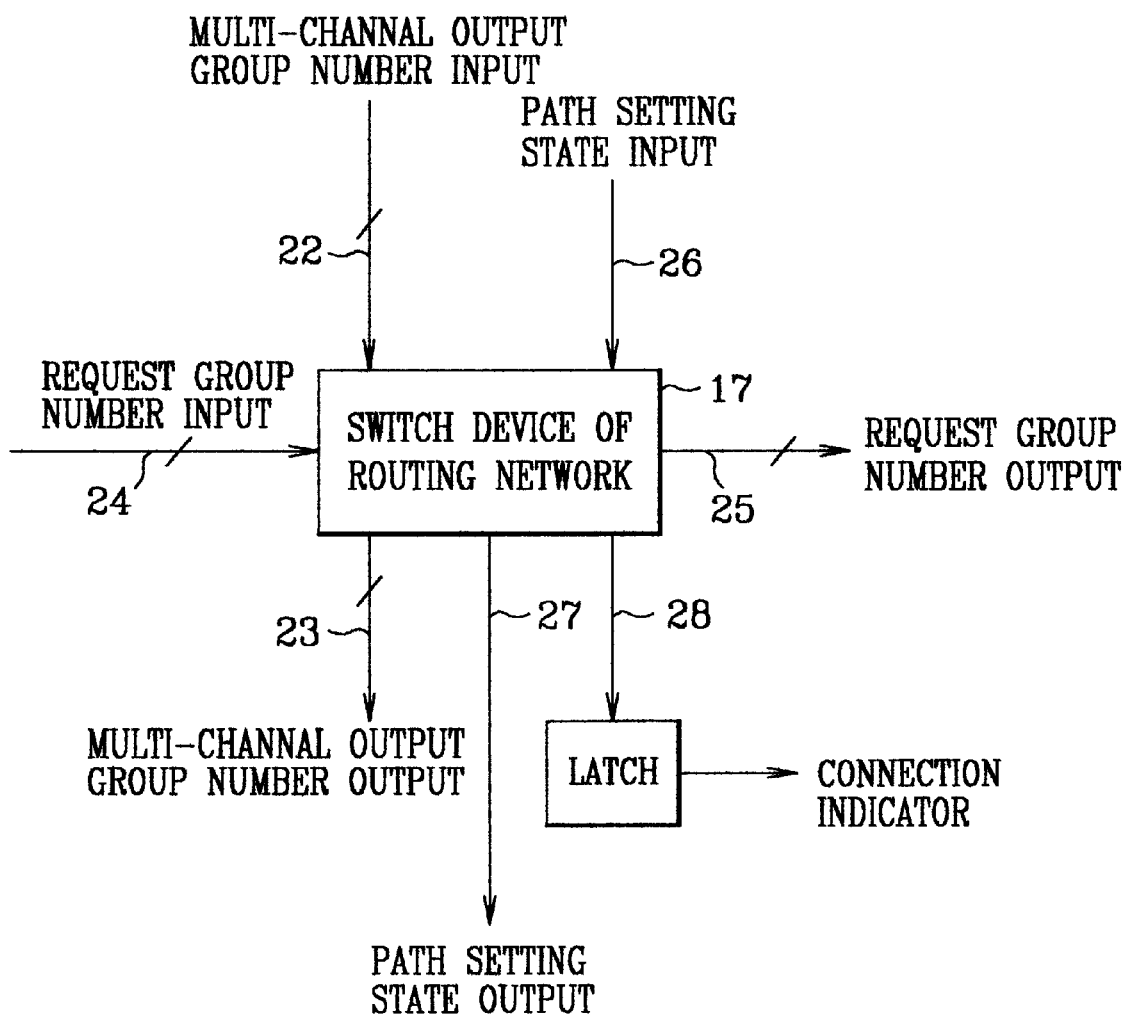
FIG. 4 is a view illustrating a signal flow of a routing network switch device according to the present invention.

FIG. 4 illustrates an input/output signal relationship of a switch device configured for a path setting and routing tag conversion, and as shown therein, each signal will be explained.

The input signal 22 of the multi-channel output group number is an output port grouping address information inputted from the output group address generator 5. Such information is composed of a plurality of bit groups in accordance with the operation speed which is required for the switching system, thus parallely processing the same.

The output signal of the multi-channel output group number is an information that the input signal 22 of the multi-channel output group is transferred to the next switch device through the switch device. The contents thereof are identical with the input signal 22 of the multi-channel output group number.

The input signal 24 of the requesting group number is a routing tag information inputted into the switch device and is composed of a plurality of bit groups in accordance with the operational speed which is required for the switching system, thus parallely processing the same.

The output signal 25 of the requesting group number is an information that the input signal 24 of the requesting group number is converted in accordance with the path allocation state by the switch device.

The path setting state input signal 26 is a path setting state information of the upper terminal switch device in the identical column.

The output signal 27 of the path setting state is a path setting state information of a corresponding switch device and is provided to the lower terminal switch device as a path setting state input signal.

A connection indicator 28 is a signal which indicates a path setting state of the switch device after a comparison is performed with respect to the path setting and is used as an enable signal for providing a data path of the input cell.

The address information comparison operation of each switch device for setting the path is continuously performed until all switch devices of the multi-channel/multi-cast routing network perform the comparison operation, so that the same is configured by a simple gate logic without using a synchronous circuit such as a flip-flop circuit.

Namely, in the path setting state, the input signal 26 and the output signal 27 are continuously varied until all switch devices of the multi-channel/multi-cast routing network are set, and there is not state variation after a predetermined time which is required for finishing all comparing operations. The time until the above-described operation is finished is called a path setting time.

After the path setting time t is elapsed, the connection indicator 29 is in the setting state of each switch device and enables the circuit with respect to the data transfer path of the input cell using the signal.

The priority wherein the cells having the identical output port address information competes with each other for an output port allocation in accordance with the above-described operational characteristic is an input sequence of the network, namely, the cell inputted through the input port 0 has the top priority, and the priority is decreased in accordance with the port sequence number. Therefore, the cell inputted through the (M−1)th port has the lowest priority.

The above-described phenomenon may be recognized to have a property between ports and becomes an important functional factor for maintaining the sequence between the cells of the identical line and the cells belonging to one virtual connection interval and being distributed to various input links. In the entire switching apparatus, the operation for maintaining the sequence of the cell will be explained with reference to FIG. 7.

When the above-described path setting operation is finished, the maximum number of switch devices which perform the connection to the output port among the switch devices of the row are 1, and the cells is transferred to the destination output port through the thusly set path, namely, the output link 16 as shown in FIG. 2.

As described above, the multi-channel/multi-cast routing network internally has a non-blocking characteristic, and the multi-channel and multi-casting functions are concurrently supplied to one network. Therefore, it is possible to maximize the cell processing ratio of the switch. Since the multi-casting function is concurrently supplied, a complicated path setting management table is not necessary between the copy network and the routing network, differently from the conventional switch apparatus. In addition, when integrating the functions using the cross-bar network as a basic type, it is possible to simply configure the switch and reduce the size of the chip by simplifying the physical pattern of the chip. Since it is possible to simply configure the layout, the chip is implemented so that the fabrication of the chips is economical.

Figure 5:
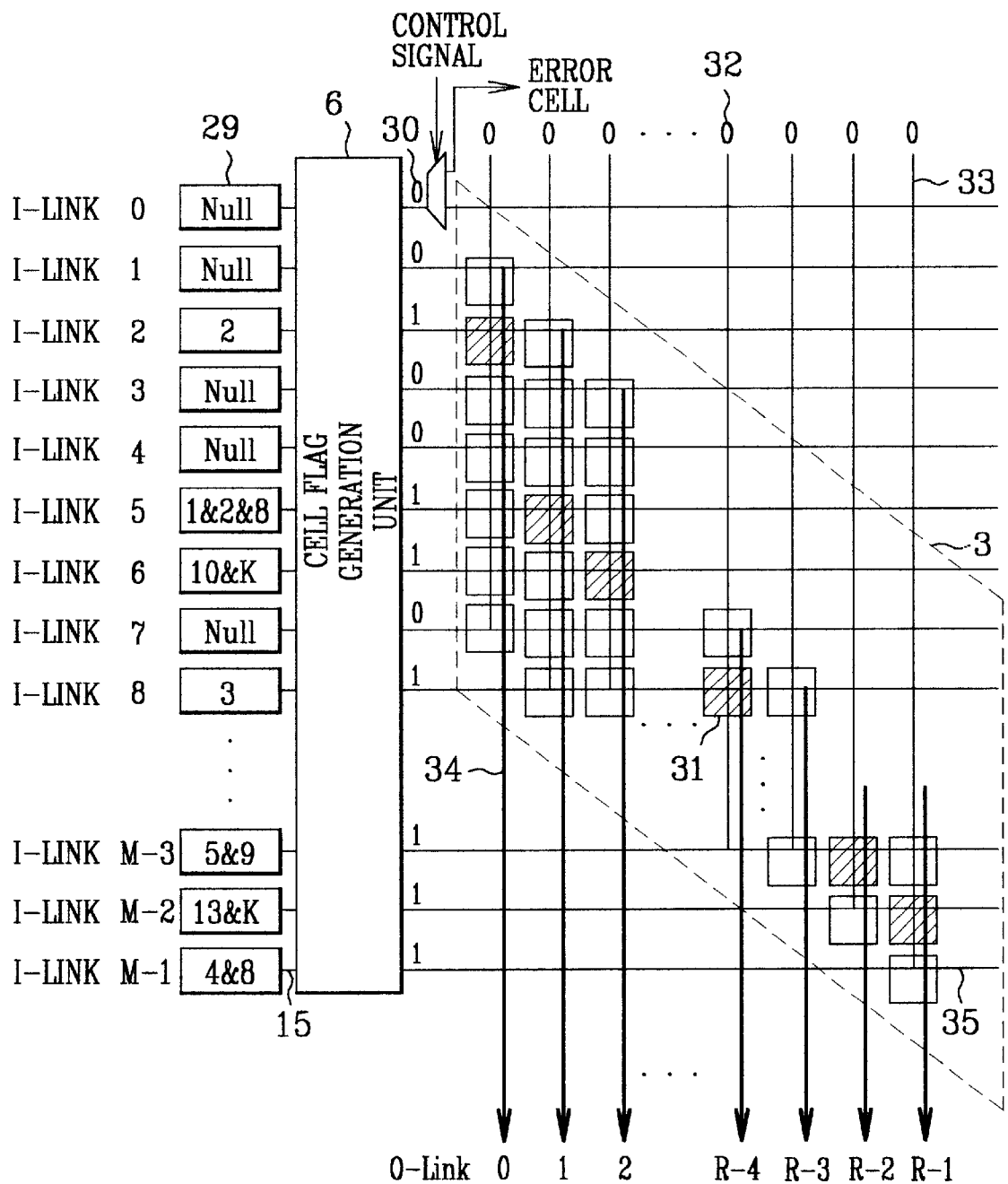
FIG. 5 is a view illustrating a recirculation path concentrating network according to the present invention.

FIG. 5 is illustrating the operations of a cell flag generation unit 6 and a recirculation path concentration network 3 according to the present invention.

Since the cell flag generation unit 6 and the recirculation path concentration network 3 are not provided with the paths during the path setting period in the multi-channel/multi-cast routing network, the cell flag generation unit 6 and the recirculation path concentration network 3 select an R-number of cells which is the number of recirculation paths among the cells transferred to the bypass link 10, and the thusly selected cells are transferred to the synchronous logic unit 4 so that the cells are inputted into the multi-channel/ multi-cast routing network through the recirculation link.

The cell flag generation unit 6 checks whether there is an assigned destination output port address in the routing tag of the cell transferred to the bypass link 15 through the routing tag conversion operation in the multi-channel/multi-cast routing network. If the multi-channel/multi-cast routing network already has the path allocated to the output port, the multi-channel/multi-cast routing network has the null address information. Otherwise, since the destination address which is outputted at the time when the next cell is transmitted exists in the tag, the cell flag generation unit 6 checks only whether the address information in the routing tag is a null state or not. Therefore, when the address information of the routing tag is a null value, the flag 30 is set to 0, and when the destination address exists, the flag is set to 1.

The recirculation path concentration network 3 selects an R-number of cells among the cells having the flag 30 having the value of 1 using the value of the flag 30 inputted through the cell flag generation unit 6, and then the path to the feedback output link 34 is allocated, and an Rx(N+1) number of 2×2 switch devices are provided.

The feedback path allocation process by the recirculation path concentration network 3 will now be explained with reference to FIG. 5.

The information type of the routing tag inputted into the cell flag generation unit through the bypass link 15 is shown at 29. The cell flag generation unit 6 indicates the state of the flag 29 as 0 if the routing tag is a null state in accordance with the state of the routing tag 25 of the bypassed cell, and otherwise, the state of the flag 29 is indicated as 1.

The comparison initial value 32 in which the state value is 0 is inputted to each column of the recirculation path concentration network 3 through the state link 33. Each switch device of the recirculation path concentration network 3 determines the path allocation of the recirculation link of a corresponding cell using the path setting state information of the switch device connected beside the row in which the information of the flag 30 of the cell flag generation unit 6 is positioned.

For example, since the flag 30 of the cells inputted through the bypass links 0 and 1 indicates that the value of the same is allocated to the path of the output port which is necessary in the multi-channel/multi-cast routing network, the recirculation path concentration network 3 is not allocated to the feedback path.

The state of the flag 30 of the cell inputted through the bypass link 2 is 1, the path to the recirculation link 0 is set, and the state of the flag 30 is converted to 0, so that the same are duplicated in the identical row, the setting of the recirculation path is interrupted.

The cell inputted through the bypass link 5 is allocated to the bypass path in the second column since the feedback path is already set in the portion above the first column. Therefore, the recirculation path is allocated to the columns from the first column to the R-th column with respect to all input cells by the above-described method. If there is more than the R-number of cells the flag of which is 1, only the R-number of cells are recirculated, and the remaining cells are transferred to the cell loss counter 10.

For example, the cells inputted through the (M−1)th bypass link shown in FIG. 5 are not allocated to the feedback path in the recirculation path concentration network 3, and the cells are transferred to the cell loss counter 10. Namely, it means that the cell loss occurs. If the cell loss level which is required in the system is high, the value of R is decreased, and the number of the hardware of the multi-channel/multi-cast routing network and recirculation path concentration network are decreased. On the contrary, if the cell loss level is low, the system should be configured to increase the value of R. Namely, since the value of R logically performs the function of the shared memory, the cell loss value is adjusted by the value of R.

In addition, for the characteristics of the present invention, since the cells inputted through the first row of the multi-channel/multi-cast routing network have the top priority compared to the other cells, the cells inputted through the first row may be allocated to all paths in the multi-channel/multi-cast routing network. However, as shown in FIG. 1, when the cell to be routed to the output port is restricted by the reverse direction buffering controller 7, since the cell inputted through the first row of the routing network 2 may be routed to the restricted output port, the assigned cell of the first row may be lost when the path to the recirculation path concentration network is not provided. In order to prevent the above-described problem, the error cell removing selection unit 11 allows the output of the first row to be inputted into the recirculation path concentration network during the reverse direction buffering operation. In addition, in the other case, a predetermined path is provided so that the error cell is removed through the error cell output port.

Figure 6:
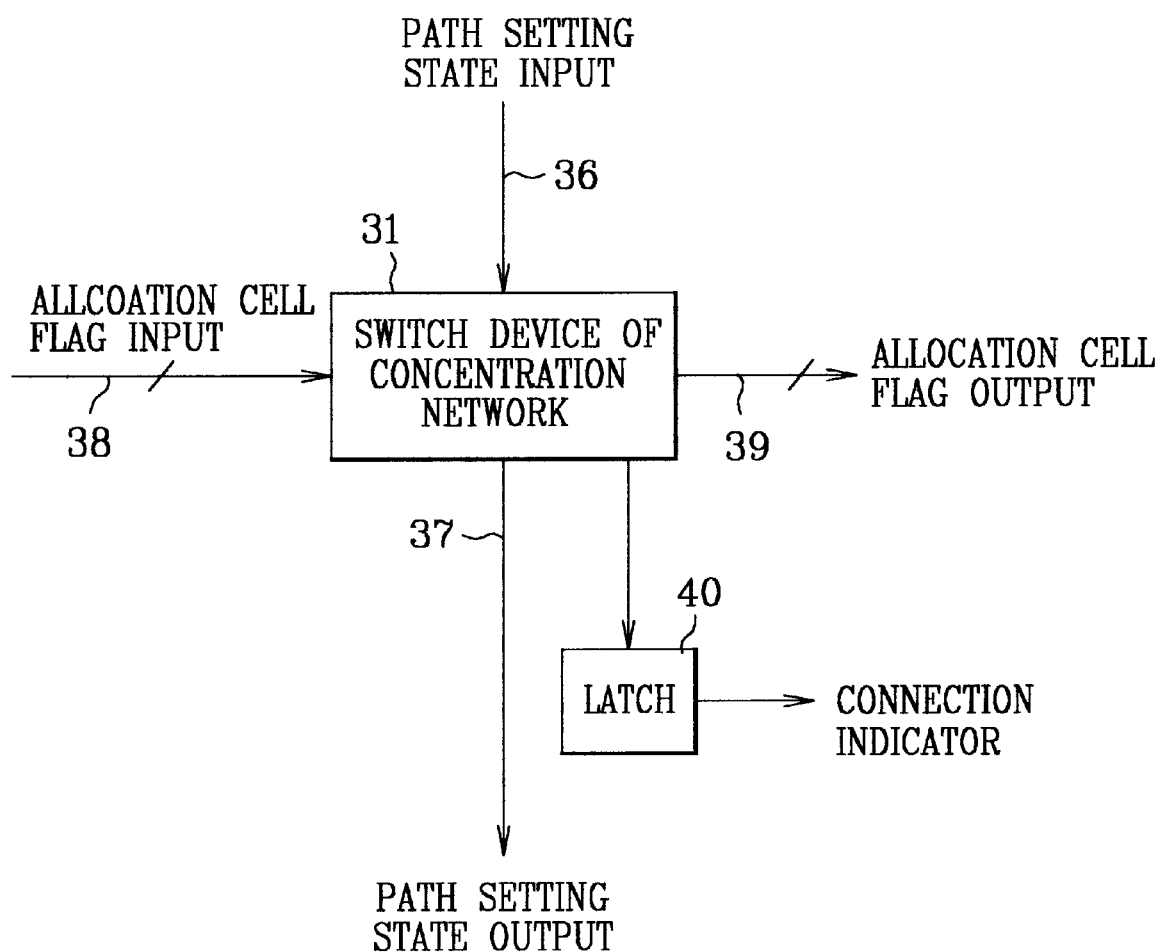
FIG. 6 is a view illustrating a signal flow of a switch device of a recirculation path concentrating network according to the present invention.

As shown in FIG. 5, the 2×2 switch device 31 which forms the recirculation path concentration network has a similar function of the multi-channel/multi-cast routing network, but it is simpler than the same. The construction of the input/output signal from the switch device 31 of the recirculation path concentration network and the operational characteristics of the same will now be explained with reference to FIG. 6.

The path setting state input signal 36 indicates a path setting state of a switch device connected in the upper portion in the identical row, and if the input signal 36 is 1, it denotes that the path is set.

The path setting state output signal 37 indicates the path setting state, which is transmitted to the lower switch device of the column based on the path setting state input 36 and its own path setting state. When the value is 0, it indicates that there is not a path setting in the upper switch device.

The allocation cell flag input 38 indicates the flag 30 which indicates the routing tag state of the cell, and the switch device of the first column receive the input signal from the cell flag generation unit 6, and the next switch device receives the same from the lefthand switch device. Each switch device checks the above-described flag. As a result of the checking, if the flag value is 1, the path setting operation is performed, and if the flag value is 0, no operation is performed, and the value is transmitted to the righthand switch device. If the path setting operation is performed, the switch device converts the flag value to 0, and the path setting operation is not performed with respect to the switch devices in the identical column.

The allocation cell flag output 39 is a signal for transferring the path setting state of the switch device to the righthand switch device, and if the allocation cell flag is 0, the same is transferred to the righthand switch device, and if the allocation cell flag is 1, the value is varied in accordance with its own path setting state, and then is transferred to the righthand circuit.

The connection indicator 40 indicates a signal which indicates the last state after the path setting operations of all switch devices of the recirculation path concentration network are finished like the connection indicator of the multi-channel/multi-cast routing network. The transfer path of the cell in the recirculation path concentration network is determined based on the above-described signal.

The switch devices of the recirculation path concentration network are composed of simple gate logic, unlike the switch devices of the multi-channel/multi-cast routing network which are composed of the synchronous logic (flip-flop, etc).

When implementing the multi-channel switching function, a sequence integrity between cells of one virtual connection which is distributed to a plurality of input links and then inputted and another sequence integrity between cells inputted through one link are important.

In particular, if the switch structure includes a recirculation path, since the cells inputted through the recirculation path are earlier in the transmission sequence than the cells which are newly inputted through the input link, the priority should be given to the cells inputted through the recirculation path in order to maintain the cell sequence integrity. The switch structure according to the present invention satisfies the above-described condition for maintaining a desired cell sequence integrity. The operation of the same will now be explained with reference to FIG. 7.

Figure 7:
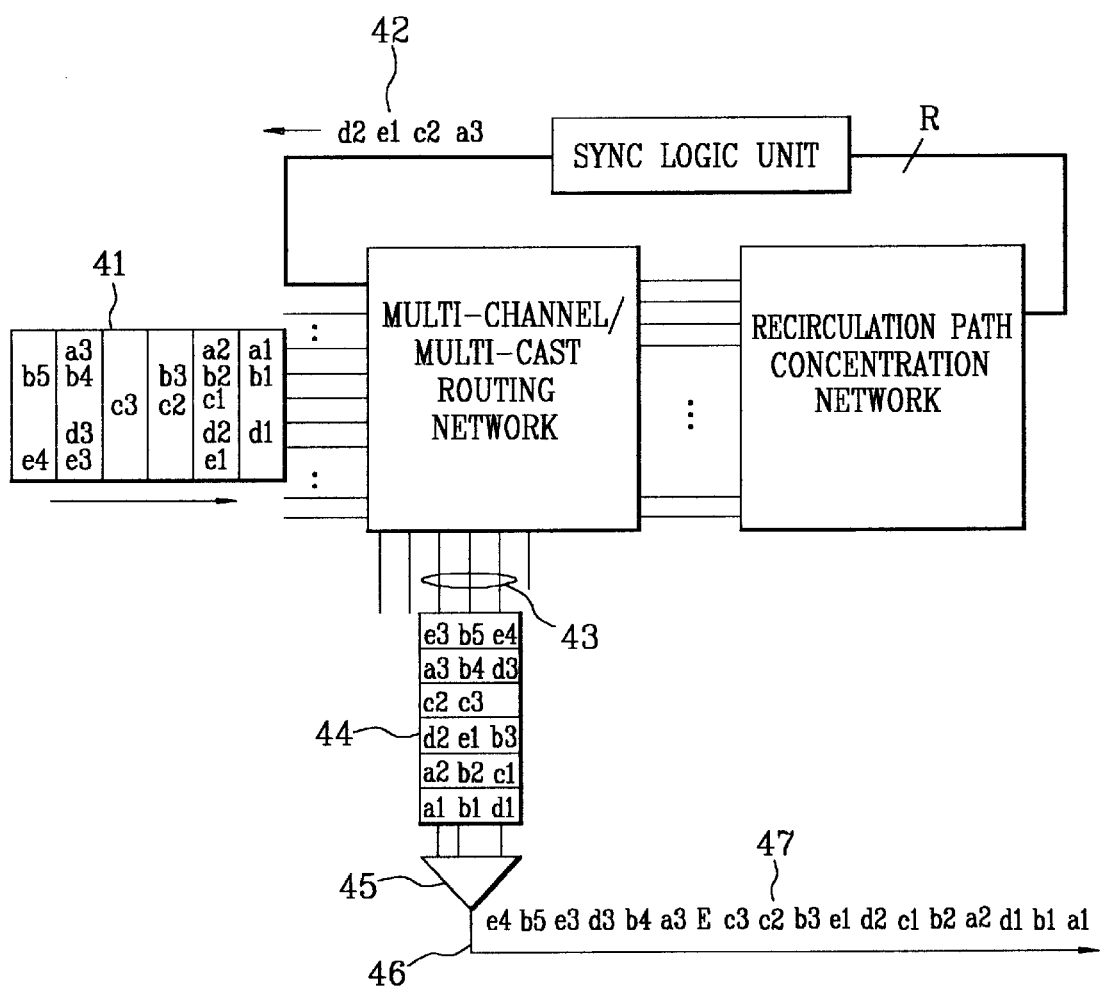
FIG. 7 is a view illustrating a cell sequence preserving operation according to the present invention.

FIG. 7 illustrates a cell sequence integrity with respect to the routing between input cells when three output links inputted through five input links are included in one group 34.

The following assumptions are given: the cells a1, b1 and d1 are inputted through links at the first cell time, and the cells a2, b2, c1, d2 and e1 are inputted at the next cell time. There are occasion that the cells are inputted at every cell time, and the cells are not inputted at every cell time. FIG. 7 illustrates that the cells are inputted until the sixth cell time.

In the multi-channel/multi-cast routing network and the recirculation path concentration network of the switching apparatus, the cells inputted through the upper row with respect to the identical destination address or the remaining recirculation path have the priority with respect to the path allocation compared to the cells inputted through the lower row when allocating the paths.

FIG. 7 illustrates a time-based input cell type 41 of the cells inputted, and the cells a1, b1 and d1 inputted at the first cell time are allocated to the paths to the output ports at the identical cell time and then are outputted, and the output ports are allocated from the lefthand direction to the righthand direction in accordance with a sequence from the upper portion to the lower portion.

Since there are five cells which are inputted at the second cell time, and the number of groups of the output ports are three, only three cells a2, b2 and c1 from the upper portion among five cells are allocated to the paths, and the remaining two cells d2 and e1 are recirculated through the recirculation path concentration network.

At the third cell time, the recirculated cells d2 and e1 and newly inputted b3, c2 compete with each other with respect to three output ports. At this time, since the cells recirculated along the recirculation path have the top priority for the allocation of the output port compared to newly inputted cells, only d2, e1 and b3 are allocated to the paths to the output port, and c2 is recirculated. Therefore, at the fourth time, since there are c2 and newly inputted c3, two cells, as shown in FIG. 7, are outputted.

The port-based time sequence of the cells outputted through the above-described operation is shown in the output port type 44 as shown in FIG. 7, and the time-based sequence of the cells outputted through the recirculation path is shown as 42. The input link-based cell sequence and the link-based cell sequence are maintained. Therefore, if a system which is capable of providing a high speed output link by multiplexing three output ports is necessary, the switch output ports are sequentially multiplexed from the leftmost portion to the rightward most portion by adding the time shared multiplexor 45. The type of the cells which are finally outputted by the above-described multiplexing function is shown as 47, and it is judged that the sequence of the cells is maintained.

Since the switch structure according to the present invention includes a recirculation path, it is possible to provide an inner buffering function. Since the number of the recirculation paths set in the apparatus is restricted, if there is a large amount of traffics inputted into the apparatus, the cell loss may occur in accordance with the lack of the recirculation path while the input cells to be outputted to the output ports are concentrated. Therefore, a reverse direction traffic flow control request signal (Backpressure request signal) is provided for preventing the cell loss by the apparatus.

As shown in FIG. 1, the reverse direction flow control request unit 8 checks the number of the assigned cells inputted from the multi-channel/multi-cast routing network 2 into the recirculation path concentration network 4 through the bypass path 15 at every cell transmission time and externally outputs through the reverse direction flow control request signal Brout (Backpressure request out) when the number of the assigned cells exceeds the upper threshold value. The Brout may restrict the traffic transfer directed to the switching apparatus until the reverse direction flow control request signal transferred to the traffic providing apparatus connected with the input ports is released.

In addition, after the reverse direction flow control request signal is generated, the number of the assigned cells on the bypass path is continuously checked, and if the number of the same exceeds a lower threshold value (LTV), the flow control request signal is continuously maintained. If the same is below the lower threshold value, since the activated flow control request signal is released, the traffic generating apparatus continuously transmits the cells to the switching apparatus.

The reverse direction flow control request unit 8 checks the flag value 30 generated by the cell flag generation unit 6 and recognizes the number of the assigned cells on the bypass path.

Figure 8:
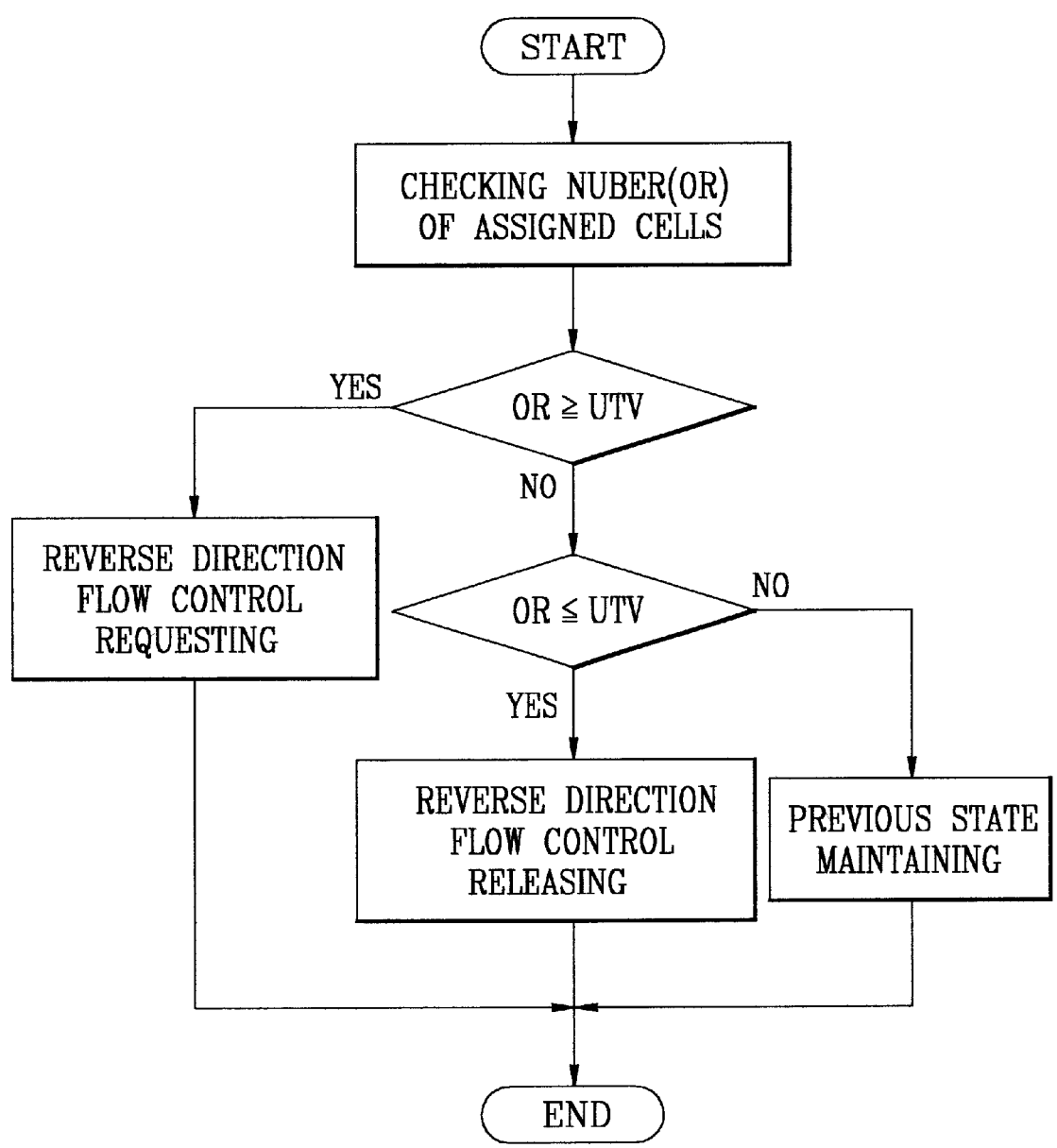
FIG. 8 is a flow chart illustrating an operation of a reverse direction flow control requesting unit according to the present invention.

FIG. 8 illustrates the reverse direction flow control request and release operation based on the upper and lower threshold values.

As shown in FIG. 8, according to the condition in view of the upper and lower threshold values, both values should be over 1, and the total recirculation path number should be below R, and the lower threshold value should be lower than the upper threshold value.

In the present invention, it is possible to prevent the cell loss, which occurs due to the over traffic operation for a predetermined time, based on the system configuration, so that the cell loss is prevented in the entire system, and the number of the recirculation paths which are formed in the apparatus in accordance with the above-described function is decreased.

The traffic destination connected with the output port of the switching apparatus may be operated at a predetermined speed slower than the operational speed of the switching apparatus or the cell processing speed in accordance with the system configuration. In addition, the output port of a plurality of switching apparatuses may be implemented using one receiving source. Therefore, in the switching apparatus, the cells which are successfully routed may be lost by the traffic source in accordance with the load of the traffic receiving source. In order to improve the cell loss characteristic in the system, in the present invention, the cell routing to a corresponding output port is restricted in accordance with the reverse direction buffering request signal (Backpressure buffering request signal) which is requested in accordance with the load state of each traffic receiving source until the requesting signal is released, so that the cell loss ratio is minimized in the system.

The operation of the reverse direction buffering controller 7 shown in FIG. 1 will now be explained with reference to FIG. 9.

The reverse direction buffering controller 7 receives an N-number of reverse direction buffering request signals which are allocated by the output port. Namely, these request signals are inputted into an N-number of flip-flops 50, respectively. The control signal from the reverse direction buffering controller 7 is updated at every cell time in accordance with the state of the request signal. The reverse direction buffering operation is controlled not to be performed at the intermediate time of the cell transmission by updating the information latched by the flip-flop 50 at the beginning time of the cell at every cell time using the cell clock 51. The output signal updated at every cell beginning time is logically ANDed with the grouping address information 21 by the logic AND-gate 48, which information is supplied from the output group address generation unit 5 to each column of the multi-channel/multi-cast routing network 2, and then the thusly ANDed signal is outputted to each column of the multi-channel/multi-cast routing network 2.

Figure 9:
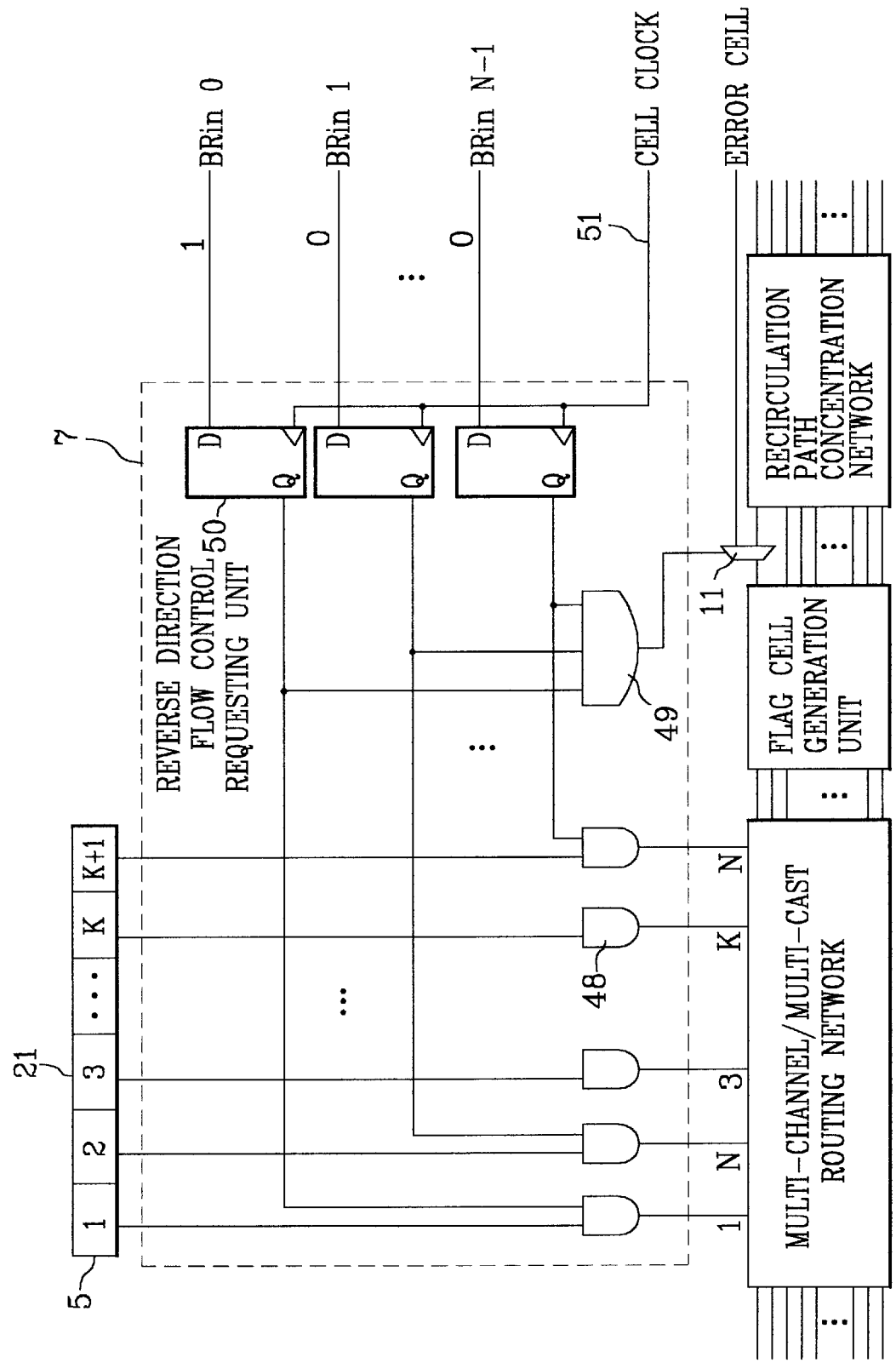
FIG. 9 is a detailed view illustrating a reverse direction buffering controller according to the present invention.

For example, as shown in FIG. 9, the request signal with respect to the output port 0 is 1 which denotes that there is not a reverse direction buffering request, and in the output port 1 and N−1, when the request signal is 0, namely, when the reverse direction buffering request is generated, the signal is latched by the flip-flop 50 and is transferred to each logic AND-gate 48. The grouping address information with respect to the output ports 1 and N−1 is converted from 2 and K+1 to null values, respectively, and then is transferred to the routing network 2. Therefore, since the output ports 1 and N−1 do not have an assigned output destination address information, respectively, and the routing tag and output port address information are not identical in the cells having the output ports 1 and N−1 among the input cells inputted into the switching apparatus as a destination, the cells are transferred to the sample tag generation unit through the bypass link.

In addition, if the reverse direction buffering request signal is not requested, the cells are continuously recirculated. Namely, the above-described recirculation operation has a buffering effect.

Here, since the first row of the routing network 2 is allocated to the routing path with the top priority, if there is not a reverse direction buffering operation, the recirculation path is not allocated to the cells outputted through the first row of the routing network 2. However, when the reverse direction buffering is performed, since the cells inputted through the first row of the routing network 2 does not have a destination address to the output port where the reverse direction buffering is requested, the cells should be inputted into the recirculation path concentration network 3 since the recirculation path should be provided with respect to the cells inputted through the first row of the routing network 2 in order to prevent the loss of cells. Therefore, the logic AND-gate 49 of the reverse direction buffering controller 7 logically ANDs all reverse direction request signals. Namely, if at least one signal among all reverse direction request signals is activated, the cells inputted through the first row of the routing network 2 are controlled to be inputted into the recirculation path concentration network 3 by controlling the error cell removing selection unit 11.

The cells are selectively inputted into the recirculation path concentration network 3 with respect to the first row of the routing network 2 because it is connected with the error cell removing function of the apparatus. The error cell removing function will now be explained.

The switching apparatus according to the present invention interprets the reverse direction buffering request signal from the traffic receiving apparatus connected with the output port and converts the address information with respect to a predetermined output port in accordance with a request signal into a null state signal and restricts the cell transmission to a corresponding output port by maintaining until the request signal is released, so that the cell loss characteristic is improved in the system.

The cell inputted into the switching apparatus is provided with a routing to a corresponding output port only when one or more values among the output port address information values is coincided. However, if the address information of the routing tag of the input cell is not coincided with all output port address information for any reason, since the input cells are not provided with the path to the output port, the switching apparatus is continuously used. Namely, in the present invention, the input cells are continuously circulated through the recirculation path.

Therefore, if the input cells (namely, error cells) which have the destination address which is not coincided with the address information by the output port are inputted into the switching apparatus, these cells should be removed from the switching apparatus, so that it is possible to prevent all elements of the system from being occupied by the error cells.

In the present invention, the priority of the routing path allocation is provided in accordance with the position of the row of the routing network 2. Namely, as shown in FIG. 2, the input cells to the upper row have the top priority compared to the input cell to the lower row. In addition, the cells which are not allocated to the path of the output port at a corresponding cell time are concentrated at the recirculation path concentration network 3 and are inputted into the routing network 2 through the recirculation path. Here, as shown in FIG. 5, in the recirculation path concentration network 3, the cells inputted into the upper row have the top priority compared to the cells inputted into the lower row.

If the cells inputted through the input port of the switching apparatus are not allocated to the path of the output port at a corresponding cell time, it is allocated to the recirculation path, and the cells are inputted into the upper row, not the input position of the previous routing network 2, at every cell time until the cells are allocated to the path of the output port when cells are re-inputted into the routing network 2 through the recirculation path. If the recirculation cells are recirculated to the upper most portion of the first row of the routing network through the above-described operation, since a corresponding input position has the top priority, the routing to a desired output port is first performed. Namely, the cells which are recirculated in the above-described method are provided with the top priority which is determined one by one at every cell, time. Therefore, if the recirculation path is R, the cells are inputted through the upper most row of the routing network 2 having the top priority within the maximum R-cell time.

The error cells having the errors in the destination address are inputted to the upper portion of the routing network 2 within the maximum R-cell time, and the error cells are inputted into the error cell removing selection unit 11, shown in FIG. 9, through the bypass path 15 and then are removed thereby. Namely, since the error cells inputted into the switching apparatus are removed to the outside within the maximum R-cell time, it is possible to prevent consumption of the resource (recirculation path) of the apparatus, thus obtaining a desired performance of the apparatus.

The above-described error cell removing operation is not performed while the reverse direction buffering control is performed. Even when the cells inputted through the first row of the routing network 2 during the reverse direction buffering period do not correspond to the error cells, the cells are not provided with the path to the output port in accordance with the reverse direction buffering control, the error cell removing selection unit 11 is controlled so that the cells outputted through the upper most row of the routing network 2 are transferred to the recirculation path concentration network 3 in order to protect the above-described cells. Therefore, when the error cells occur during the reverse direction buffering control operation, such error cells are not removed by the apparatus and occupies the recirculation path. When the reverse direction buffering control is released, the error cells are removed within the maximum R-cell time.

In accordance with the configuration method of the system, the cell flow restriction function may not be provided in the traffic providing source as a response with respect to the reverse direction flow control request signal. In this case, in the switching apparatus, the cell loss may occur in the apparatus in accordance with the state of the input traffic due to the lack of the recirculation path which consists of a predetermined number.

Therefore, in the present invention, the error cells processed by the input port are counted, and are transferred to the system maintenance function unit, so that the management and maintenance of the bandwidth are improved.

As shown in FIG. 5, the recirculation path concentration network 3 has the total (M=N+R) number of input ports, and the number of recirculation paths is R. Therefore, when the M-number of assigned cells is inputted into the recirculation path concentration network 3, only the R-number of cells are allocated to the recirculation path, and the N-number of cells are processed as error cells.

As seen in the operational characteristic of the recirculation path concentration network 3, since the input cells inputted through the upper row have the top priority, the N-number of input cells from the lowest portion are processed as error cells. As shown in FIG. 1, the cells newly inputted into the switching apparatus have lower priority for providing a path compared to the cells inputted through the recirculation path in the routing network 2, and the above-described priority influences the input process to the recirculation path concentration network 3. Therefore, the N-number of cells from the lower portion of the input port of the recirculation path concentration network 3 are used for transferring the cells which are newly inputted through the input port of the switching apparatus within a corresponding cell time. Therefore, the cell loss may occur with respect to the newly inputted cells, not with respect to the cells which are recirculated.

The cell loss counter 10, as shown in FIG. 1, is connected with respect to the N-number of input cells from the lowest portion of the recirculation path concentration network 3 as shown in FIG. 5 using the above-described characteristic. The cell loss counter 10 as shown in FIG. 5 updates the counter value at every cell time in accordance with the assigned cell flag 30 generated by the cell flag generation unit 6. The cell loss counter 10 counts the value by the input port with respect to the cell loss in accordance with the above-described operation.

Since the counter has a limit value when physically accumulating the value, the counter is composed of a ring counter, thus continuously performing a counting function, and if the value exceeds a predetermined limit value, the counter is connected with the system controller connection unit, shown in FIG. 1, in accordance with the function for generating the carry flag at the request of the system control function unit, thus transferring the counter value, and the restart instruction from the counter is received, and the counting operation is continued by the counter.

Since the system controller checks the cell loss which occur by the input port, the above-described operation is used for managing the requesting operation of the virtual connection which is newly generated or the bandwidth of the system.

As described above, the present invention has the following effects.

First, since the operation of the switch has a switching function, it is possible to effectively adapt the input/output link which become "n" times of the basic speed V of the switch port using one switch network, and it is possible to dynamically allocate the "n" time up to the total switch size of N, so that the input/output links having different speeds are adapted to one switching system, and thus it is possible to provide various services with respect to the system. In addition, in the present invention, since the multi-channel switching includes an operational characteristic of an output buffer type, a plurality of switch ports is used for a group with respect to an input/output link the requested cell loss value of which is very low compared to other ports, and the cell loss characteristic is improved without supports based on the system.

Second, since a copy and routing operation of a cell is processed using one network, it is not necessary to configure the table for setting the path which is formed between two networks because the routing network and copy network are separated from each other, so that the system fabrication cost is decreased, and a control operation of the system control software is simplified.

Third, since it is possible to provide a cell sequence maintaining function, which is the problem of the conventional multi-channel switch, to a switch network, the control operation for a cell sequence maintenance which is required for a service terminal is simplified, so that the construction of the terminal system is made easy, and the information factor for a cell sequence maintenance is not used for the payload of the cell, so that it is possible to maximize the amount of information which is transferred at the unit time.

Fourth, it is possible to provide an expanded switch structure of a multi-network structure by using a unit switch having a multi-channel switching operation and a cell sequence preservation characteristic. At this time, the links connected between terminals are recognized as one group, so that it is easy to maintain the bandwidth, and it is possible to maximize the cell processing capability effectively using the burst characteristic of the traffic based on the possible total bandwidth.

Fifth, it is possible to configure the routing of the pattern with column and row, which routing operation is required in the device when integrating the device based on a very large scale with respect to the switch by using the 2×2 simple switch device and a network of a cross-bar type for the construction of the switch, so that the device development is made more easily because the pattern routing of the integration circuit has a simple structure.

Sixth, when the cell loss may occur due to the lack of the circulation path of the apparatus by using the load level of the recirculation path which is capable of providing the function of the shared buffer, since it is possible to request the restriction of the traffic flow toward the input traffic providing apparatus, the cell loss which may occur in the switching apparatus under an over load may be prevented.

Seventh, if the reverse direction flow control request signal inputted by the output port is received, the cells outputted to the destination of a corresponding output port are buffered in the apparatus, and the cell loss is prevented in the apparatus connected with the output port, thus improving the cell loss characteristic of the system.

Eighth, in the present invention, the error cells due to the error of the routing tag are automatically removed in the apparatus, so that it is possible to prevent the degradation of the performance of the apparatus due to the occupance of the error cells.

Ninth, the cell loss which is generated in accordance with the lack of the resource in the apparatus is counted by the input port and then the thusly counted loss is transferred to the system controller. Therefore, it is possible to more easily perform the bandwidth management and the performance checking function of the apparatus of the system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A packet switching apparatus, comprising:

an output group address generation means for generating an address information of a grouped output port;

a routing means for receiving a cell recirculated through a recirculation path and a newly inputted cell, allocating an output link with respect to the recirculated cell when an address by the output port inputted from the output group address generation means and a destination address set in a routing tag of the cell inputted by the port are identical, and outputting cells, which are not applied to the output link, through a plurality of bypass links;

a recirculation path setting means for selecting cells as many as the number of recirculation paths among the cells inputted through a plurality of bypass links and outputting through the recirculation output link;

a synchronizing means for synchronizing the cells recirculated through the recirculation link with the cells newly inputted into the routing means based on time and providing to the routing means;

a reverse direction flow control requesting means for counting the number of cells which are recirculated at every cell time and requesting a reverse direction flow control to a traffic providing source when the thusly counted number exceeds a threshold value;

a reverse direction buffering control means for restricting a cell output to the output port through which a request signal is outputted when a reverse direction flow control request signal is received from the traffic receiving source until the request signal is released;

an error cell removing means for removing an error cell based on the routing tag error among the cells from the bypass link by the routing means within a predetermined time; and a cell loss counting means for counting the cell loss which are not recirculated by the recirculation path setting means by the input port.

2. The apparatus of claim 1, further comprising a system controller connection means connected with a system controller for receiving a cell loss value from the cell loss counting means, transferring to the system controller, receiving an instruction from the system controller, changing a group address information from the output group address generation means, re-starting the cell loss counting means, and transferring a limit value to the reverse direction flow control requesting means in accordance with a request signal generation and release.

3. The apparatus of claim 1, further comprising a cell flag generation means for setting a cell flag which determines an assigned cell inputted in accordance with a routing tag value of a cell from the routing means through a plurality of bypass links and providing to the recirculation path setting means.

4. The apparatus of claim 3, wherein said cell flag generation means sets a flag value using a null cell when the routing tag value of the cell inputted through the bypass link is allocated to an output path, and sets a flag value using an assigned cell when a predetermined information, which indicates that the output paths are not allocated, is included in the routing tag value of the cell inputted.

5. The apparatus of claim 1, wherein said output group address generation means includes an N-number of address transmission logic when the number of output ports is N which denotes a natural numeral, wherein an output port address transmitted from each address transmission logic is composed of an N-number of bits, and each bit uses a bit addressing method related with each output port, and the N-number of address transmission logic is capable of transmitting the identical destination address information from 1 to N-number, and the address information from each address transmission logic is converted into a predetermined address information dynamically in accordance with an output port configuration which is required in the system.

6. The apparatus of claim 1, wherein said routing means includes:

a multi-casting function for comparing a destination address of a cell having a plurality of destination address information with an output port address from the output group address generation means and concurrently outputting one input cell to a plurality of output ports, respectively, having the identical addresses; and a multi-channel function for concurrently outputting a maximum M-number of cells having a destination address information among the cells inputted when the address information is a natural number of m among the address information provided from the output group address generation means.

7. The apparatus of claim 6, wherein said routing means is composed of a cross-bar type using a plurality of switching devices, wherein a plurality of switching devices connected with a corresponding row and a corresponding column receive cells from a plurality of input ports connected with each row, an address is received by the output port from the output group address generation means connected with each column, and an output link is allocated with respect to an input cell when the output link from the switching device of the upper row is already allocated, and a destination address corresponding to the output link which is allocated among the addresses of the routing tag added to the input cell is converted into a null value.

8. The apparatus of claim 7, wherein said switching device receives an output port address from the output group address generation means, sets a connection identifier when the destination address of the inputted cell and the output port address are identical, sets a path setting state to a predetermined value, outputs to the switching device of the lower row, outputs to the switching device of the next row by correcting the routing tag of the inputted cell, and directly outputting without varying the path setting state information and the routing tag of the input cell when the path is set in the switching device of the upper row or the destination address of the cell inputted and the output port address are not identical.

9. The apparatus of claim 3, wherein said recirculation path setting means does not set a recirculation output link when the flag inputted from the cell flag generation means indicates a null cell, and sets a recirculation output link when the inputted flag denotes an assigned cell or the recirculation output link is not set in the upper row.

10. The apparatus of claim 9, wherein said recirculation path setting means is composed of a network wherein the number of input ports is M having a cross-bar network type using a plurality of switching devices, the number of recirculation paths among the output port is R, and the number of ports outputted to the cell loss counting means is N, and wherein in the switch device of each row and column, the flag value inputted from the cell flag generation means indicates an assigned cell, and the recirculation link is allocated when the recirculation link corresponding to the switching device of the upper row is not set, and the cells are outputted to the switching device of the lower row by varying the path setting state information, and are outputted to the switching device of the next row by varying the flag value.

11. The apparatus of claim 8, wherein in said apparatus, a recirculation cell from the synchronizing means is inputted into an input port of the upper row of the routing means, and the cells which are newly inputted are inputted into the input port of the lower row of the routing means, so that the recirculated cells are first allocated to the output link compared to a newly inputted cell.

12. The apparatus of claim 3, wherein said reverse direction flow control requesting means transfers a reverse direction flow control requesting signal to a cell providing source when the occupying ratio exceeds a predetermined upper limit value by checking the cell occupance ratio on the recirculation path after the upper and lower threshold values are set by the system controller connection means, maintains the flow control requesting signal until the occupance ratio of the recirculation path becomes below the lower limit value after the flow control requesting signal is generated, and releases the flow control requesting signal when the occupance ratio becomes below the lower limit value.

13. The apparatus of claim 12 wherein said upper and lower limit values are defined to be below a total number of recirculation paths, and the lower limit value is adjusted to be smaller than an upper limit value.

14. The apparatus of claim 12, wherein said reverse direction buffering control means checks the reverse direction flow control request signal inputted by the output port, restricts the cell routing to the output port matching with the requesting signal when the requesting signal is in an activated state in which a flow control is performed, wherein the cells which are blocked from the routing are configured to have a buffering effect of the cells the transmission of which is restricted by recirculating until the flow control requesting signal is released through the recirculation path setting means.

15. The apparatus of claim 14, wherein said reverse direction buffering control means converts the address information from the output ports in which the reverse direction flow control is requested among the output group address information from the output group address generation means into a null value and recoveries the address information having the null value into an original address information when the reverse direction flow control request signal is released.

16. The apparatus of claim 15, wherein said reverse direction buffering control means includes:
    a plurality of latch means for latching a reverse direction flow control requesting signal inputted from a plurality of cell receiving sources in accordance with a cell clock, respectively;
    a first logic AND-gate for logically ANDing output signals from the latch means and an output group address information from the output group address generation unit which is matched one to one; and
    a second logic AND-gate for logically ANDing the output signals from the latch means and outputting to the error cell removing means.

17. The apparatus of claim 16, wherein said plurality of latch means each includes:
    a flip-flop for updating a reverse direction flow control requesting signal from the cell receiving source at every cell time in synchronization with the cell clock signal.

18. The apparatus of claim 3, wherein said error cell removing means receives a cell having the top priority among the cells from the routing means through the bypass link, and inputting into the top priority link of the recirculation path setting means in accordance with a control signal from the reverse direction buffering control means or externally outputting the same.

19. The apparatus of claim 18, wherein said error cell removing means includes a selection unit for outputting a cell inputted through the input link to the recirculation path setting means, which input link has the top priority of the routing means when receiving a report, which denotes that the reverse direction buffering control operation is being performed, from the reverse direction buffering control means and outputting a cell inputted through the top priority input link to the outside when receiving a report which denotes that the reverse direction buffering control operation is not performed.

20. The apparatus of claim 3, wherein said cell loss counting means includes:

a counter which corresponds to the output port of the recirculation path setting means one to one for processing the loss of the cells which are not allocated with the recirculation path, wherein the counter is configured in a ring type and generates a carry flag when the count value reaches a predetermined limit value.

21. The apparatus of claim 3, further comprising:

an expanding switch in accordance with a multi-tiered interconnection network construction method using the packet switching apparatus as the unit switch, wherein the traffic flow is controlled using the reverse direction flow control requesting means and the reverse buffering control means.

* * * * *